3,238,128
APPARATUS AND PROCESS FOR TREATMENT OF LIQUIDS WITH LIME

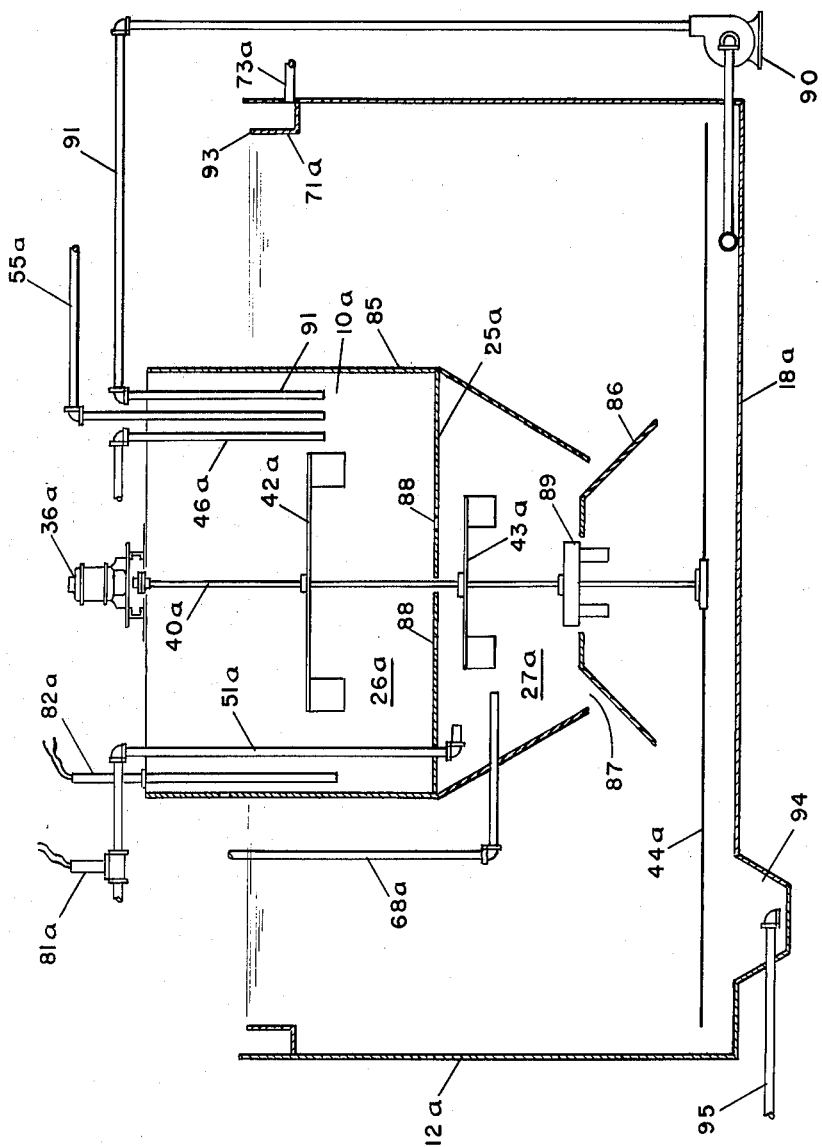

Hilding B. Gustafson, Tucson, Ariz., assignor to Fuller Company, Catasauqua, Pa., a corporation of Delaware
Filed Dec. 26, 1962, Ser. No. 247,144
12 Claims. (Cl. 210—46)

This invention relates to an apparatus and a process for the treatment of liquids, such as aqueous solutions, by lime and specifically to such an apparatus and process which are automatically controlled.

It is an object of this invention to provide an improved apparatus and process for lime treatment of liquids, such as aqueous solutions.

Another object is to provide simple and reliable means for automatically controlling lime treatment of water.

Another object is to provide an improved apparatus and process for automatically controlling the lime feed to a variable liquid, such as an aqueous solution, to provide a satisfactory final liquid.

The term "variable" is used herein to denote variations in quantity, and/or quality, and/or temperature.

Another object is to provide an apparatus and a process for treating water of constant or variable characteristics with lime which require a minimum of attention.

Another object is to provide an apparatus and process of the type referred to, utilizing simple and inexpensive means for preparing and feeding a lime paste.

Another object is to provide in an apparatus of this general type distinct zones wherein different pH values are maintained.

Another object of the invention is to provide an apparatus and process of the type referred to which permit considerable savings in coagulant.

Other objects will become apparent upon consideration of the detailed description and the claims which follow.

Lime treatment of water is used mainly for alkalinity reduction and clarification. Usually the lime is fed as a thin slurry in quantity proportioned to the raw water flow. This requires accurate feeders and proportioning equipment, all of which is expensive in first cost and maintenance. With a water which varies in quality, the proper quantity of lime to be fed is established by chemical tests of the raw water, or the treated water, or both, and by manual adjustment of the feed rate. In many smaller plants there is not sufficient skilled personnel available to run these tests at the proper intervals. Due to this requirement of attention by skilled operators, many a plant which could profit from complete or partial lime treatment, could not afford such treatment.

There is, therefore, a definite need for an automatic plant for lime treatment of water, provided the automation is carried out by simple, reliable equipment with relatively low first cost.

The apparatus of my invention treats variable waters entirely automatically, the only operating attention required being to keep the lime feeder supplied with lime. The control system uses simple and reliable equipment and is not dependent on the accuracy of chemical feeders, proportioners and flow controllers.

The invention is based on my discovery that the conductance of a slurry resulting from lime treatment of water is less than the conductance of the raw water, except when an appreciable excess of lime is used. When lime is added to a typical raw water having sufficient alkalinity and hardness to make it susceptible to lime treatment, say one with a conductance of 800 micromhos, the conductance drops as the calcium bicarbonate is precipitated, until it reaches about 525 micromhos, at which point the calcium bicarbonate and any magnesium salts present have been precipitated. Upon adding further quantities of lime, the conductance rises until it equals that of the raw water, and when adding more lime the conductance rises to above that of the raw water. Thus, when the ratio of the conductance of the slurry resulting from the lime treatment of the water to that of the raw water is greater than 1, it can be safely assumed that enough lime has been used for complete treatment of the raw water. This holds true despite an increase or decrease of the mineral content of the raw water, including such salts as $Na_2SO_4$ or $NaCl$. As long as the conductance ratio exceeds 1, sufficient lime has been added.

The amount of excess of lime required to produce this greater than 1 ratio is relatively small, due to the fact that calcium bicarbonate has a conductance of about 2 micromhos per part per million in terms of calcium carbonate, whereas calcium hydroxide has a conductance of about 5 micromhos per part per million in terms of calcium carbonate.

Based on this recognition, I control the lime feed by means of a conductivity ratio controller set to maintain the proper ratio between the conductance of the lime treated water and the raw water. The electrode of one conductivity cell is placed in the raw water stream, and the electrode of a second cell into the slurry resulting from the mixture of the raw water, the lime feed and, preferably, solids containing $CaCO_3$ and $Mg(OH)_2$ precipitated from previously treated raw water, with the conductivity ratio of the controller starting and stopping the lime feed to maintain the set ratio.

With this type of control it is no longer necessary to proportion the chemical feed to the raw water flow. An increase in raw water flow automatically reduces the conductivity ratio and increases the lime feed. Similarly, the conductivity ratio controller automatically adjusts the lime feed to compensate for changes in alkalinity and hardness of the raw water. Accuracy of lime feed, which is essential when proportioning the lime to the raw water feed, is immaterial in my process, since the lime feed is regulated by the results of the treatment. This permits using inexpensive feeding equipment.

The lime is fed in the form of a thick paste made up by adding lime to water in the ratio of 50 pounds of lime to about 7½ gallons of water. While it may seem difficult to mix such large quantities of lime with such relatively small amounts of water, I have discovered that this can be done in a very simple manner by depositing the lime on the surface of the water. As the lime becomes wetted, it sinks into the water, resulting in a paste comprising about 5 pounds of lime per gallon of water. Due to this high concentration the lime remains in suspension and no appreciable settling occurs, so that stirring of the lime paste is not required. A paste, as described above, made up of 50 pounds of lime and about 7½ gallons of water occupies a volume slightly less than 10 gallons, no more space than the dry lime.

The paste-like slurry can be readily pumped. No scaling problems exist, since the small amount of water used does not result in formation of an appreciable amount of calcium carbonate. This contrasts very favorably with conventional practice, where the lime is fed as a slurry by wet chemical mixing and feeding equipment, or in dry condition by dry chemical feeders. In either case dilution water is added which reacts with the lime to precipitate calcium carbonate while the mixture flows to the point of application. Thus, scaling of pipes and pumps occurs.

My new manner of preparing the lime paste permits considerable savings not only in feeding equipment, but also in chemical handling. Large plants can save on the cost of lime by buying bulk carload lime and converting it to a slurry in the manner described for bulk tank storage, ready to be pumped to the point of use when needed, or by buying a lime slurry or paste as available from calcium carbide manufacture. The exact consistency of such a slurry or paste is not important with my novel control.

The savings in equipment and chemical handling will more than offset the cost of the excess lime used in the process. Some waters are treated to distinct advantage by use of excess lime and the conductivity control permits the controlled use of any excess that is desired regardless of variations in water composition or flow.

The use of excess lime requires further treatment for stabilization of the water. This can be done in various ways. One means is recarbonation with flue gas or liquid carbon dioxide. The recarbonation is carried out to a selected pH value, and results in a treated water of uniform methyl orange and phenolphthalein alkalinity.

Another means of dealing with the excess lime is based on my recognition that when using a conductivity ratio setting approaching 1.0, for example 1.0—, the amount of excess lime in the lime treated water is proportionate to the alkalinity of the raw water. Therefore, by treating a definite proportion of raw water with lime under ratio control at a ratio of 1.0+ in a first stage, and thereafter adding a second definite portion of raw water to the lime treated portion in a second stage, a uniformly lime treated water is obtained.

Thus, in this split treatment, the excess lime fed in the first stage of my process, which permits automatic control of the lime feed by simple, reliable means, is not wasted but is utilized for the treatment of a proportionate amount of additional raw water. This split treatment has the further advantage that recarbonation usually is not required to obtain a satisfactory final water.

A further saving is obtained by my invention due to the fact that the lime treated water is partially clarified before its coagulation, whereby the quantity of coagulating chemicals required is materially reduced as compared to the usual coagulation of unclarified lime treated water.

The apparatus of my invention may take various forms. It includes a reactor wherein lime treatment and flocculation take place, a clarifier, means for preparing and feeding lime, preferably as a paste, and control means regulating the lime feed from a set ratio between the conductivity of the raw water and the lime treated water. The reactor and the clarifier may be arranged in a common basin, or in separate basins. In each form of the apparatus simple means are used to establish a plurality of zones or compartments in the reactor, wherein different pH values prevail. Preferably, means are provided for returning some previously precipitated solids containing calcium carbonate and magnesium hydroxide to and mixing them with the raw water and lime, to make use of the well known advantage of slurry recirculation.

The invention will be more readily understood by consideration of the drawings, wherein FIGURE 1 is a vertical cross-sectional view of one embodiment of an apparatus according to the invention;

FIGURE 4 is a vertical cross-sectional view of another embodiment of an apparatus according to the invention.

Figure 1:
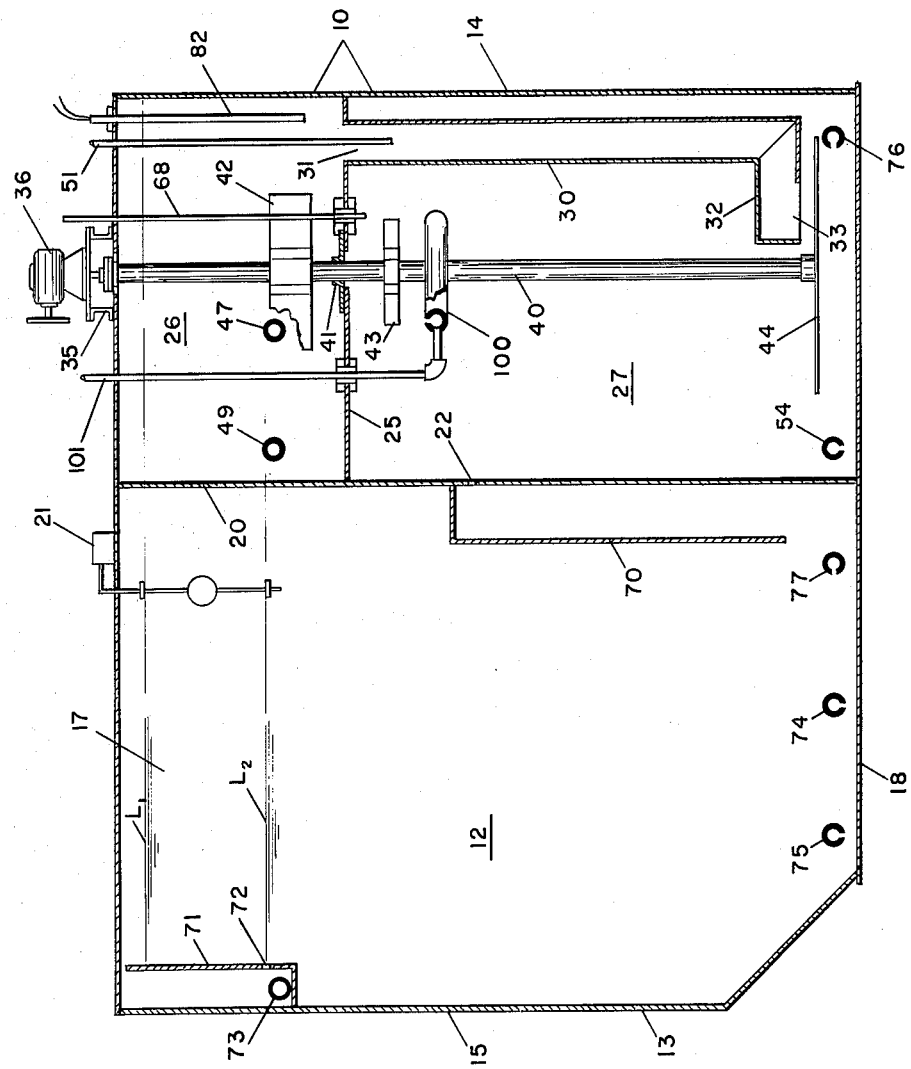
Figure 2:
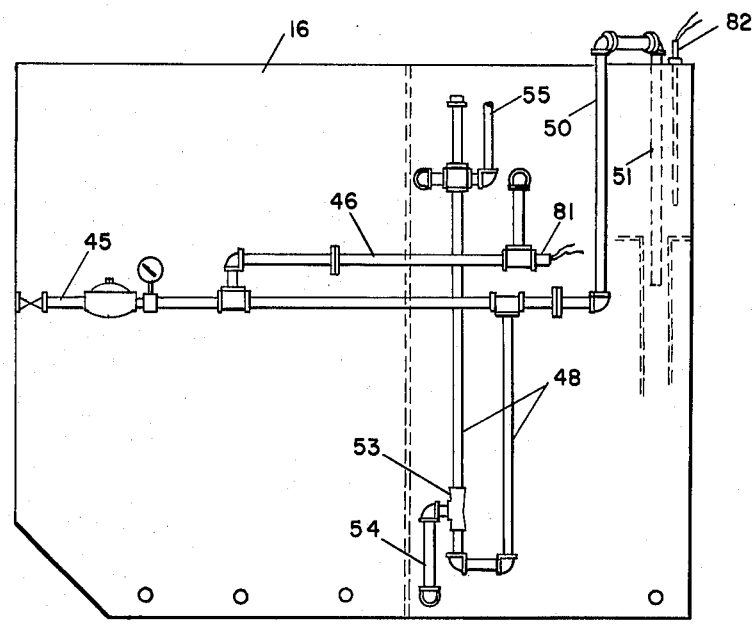
FIGURE 2 is a front elevation of the apparatus of FIGURE 1.

In the apparatus shown in FIGURES 1 and 2 the reactor 10 and the clarifier 12 are arranged side by side in a common basin 13 having side walls 14 and 15 and end walls 16 and 17 and a substantially flat bottom 18. A vertical partition 20 extending the full width of the basin 13 from the bottom to an elevation above the predetermined maximum water level $L_1$, established by a conventional float controller 21, separates the reactor 10 from the clarifier 12. The reactor and clarifier are in hydraulic communication at a central elevation through a passageway 22 which may be formed by any suitable means, such as a slot, a conduit or, as shown, a series of orifices through the partition 20.

A horizontal partition 25 forms in the reactor 10 an upper compartment 26 and a lower compartment 27. The two compartments are in hydraulic communication through a conduit 30, which leads from a port 31 in partition 25 down into the lower compartment 27 and has a horizontal inward extension 32 with a slotted bottom portion 33. A bridge or beam 35 across the reactor 10 supports a motor-reducer 36. A shaft 40, connected to the output shaft of the motor-reducer 36, extends through the upper compartment 26 and the partition 25 to the lower part of the lower compartment 27. A seal 41 is provided between the shaft 40 and the partition 25 to prevent leakage of liquid around the shaft. Affixed to shaft 40 in the upper compartment is a rotor 42 for mixing raw water, lime and recirculated slurry. In the upper portion of the lower compartment the shaft 40 carries a rotor 43 for mixing coagulant with partially clarified liquid. A stirrer 44 for keeping precipitated calcium carbonate containing solids in suspension is affixed to the shaft 40 in the lower portion of the lower compartment.

Figure 3:
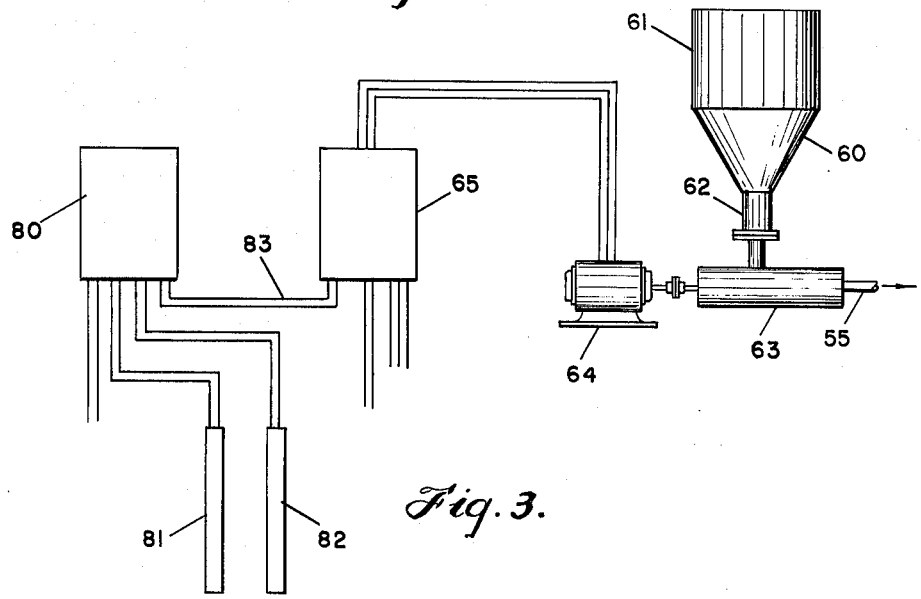
FIGURE 3 shows diagrammatically the lime feed control means.

A raw water inlet conduit 45 (see FIGURE 2) has a branch 46 which discharges into the upper compartment 26 through an inlet 47 adjacent the rotor 42, a second branch 48 which discharges into the upper compartment 26 through an inlet 49 near the inlet of the first branch conduit, and a third branch 50, which discharges through a pipe 51 into the conduit 30 below the partition 25. As shown in FIGURE 2, the raw water in the second branch 48 operates an ejector 53 to which a slurry recirculation line 54 is connected. Line 54 leads from the lower part of the lower compartment 27 through wall 16. The lime for the treatment of the raw water is introduced through a conduit 55 into the second branch 48 just ahead of the inlet 49. The second branch, therefore, discharges a mixture of raw water, recirculated slurry of previously precipitated calcium carbonate containing solids and of lime into the upper compartment. The lime conduit 55 is connected to a lime feeder 60. As shown in FIGURE 3, the lime feeder 60 may be simply a hopper bottom tank 61 of suitable size, with a bottom outlet 62 connected to the suction side of a pump 63, which has its discharge side connected to conduit 55. Drive means 64 provided with starting means 65 are connected to the pump 63.

A coagulant pipe 68 extends through the upper compartment 26 and the partition 25 and discharges in the upper portion of the lower compartment 27 adjacent the rotor 43.

In the clarifier 12 an inlet baffle 70 deflects the liquid entering through the passageway 22 downward to an elevation spaced above the bottom. Treated and clarified effluent is withdrawn from the clarifier 12 through an effluent launder 71 provided with inlet orifices 72 located at the predetermined minimum water level $L_2$, established by controller 21, and an outlet conduit 73. Sludge blow-down lines 74 and 75 lead from the lower portion of the clarifier 12, and flushing lines 76 and 77 are connected to the lower compartment of the reactor and the clarifier, respectively, as shown. A sludge blowdown line, not shown, may branch off from sludge recirculation line 54.

A conductivity ratio controller 80 (FIGURE 3) is used to control the amount of lime fed by pump 63 in accordance with a set ratio between the conductivity of the raw water and of the slurry of raw water, lime and recirculated solids in the upper compartment, as measured and transmitted to the controller by the electrodes of a pair of conductivity cells. A number of conductivity ratio controllers are available, such as, for example, the instrument sold by Industrial Instruments, Incorporated, of Cedar Grove, New Jersey, under the designation RE18G SOLU BRIDGE Controller. Since such conductivity ratio controllers can be bought on the open market and their construction and operation are well known in the art, it is not believed necessary to describe this instrument in detail. Suffice it here to say that one of a pair of conductivity cells, 81 and 82, connected to the controller, for example cell 81, is placed in the raw water stream, as shown in FIGURE 2, and the other conductivity cell, 82, extends into the upper compartment 26 to an elevation below the predetermined minimum liquid level, as established by the controller 21, so that it is at all times submerged, as shown in FIGURES 1 and 2. The conductivity controller 80 is connected electrically to the starter 65 of the lime feeder drive 64 by a power circuit 83, as shown in FIGURE 3.

In operation, a suitable proportion of the raw water is introduced into the upper compartment 26 through inlets 47 and 49. The raw water entering through inlet 47 constitutes the ejector pressure water for return of sludge to the upper compartment and may be roughly one fourth of the raw water admitted to the upper compartment. The lime introduced into the upper compartment 26 is mixed with the raw water and a large quantity of previously precipitated calcium carbonate particles by rotation of the mixing rotor 42.

The effluent of the upper compartment passes through conduit 30 into the lower portion of the lower compartment 27. While the effluent flows through the conduit 30, the balance of the raw water is added thereto. The excess lime in the effluent reacts with the alkalinity in the added raw water. This results in a properly treated stable final water. The mixture of effluent and newly added raw water is discharged downward from the conduit 30 through the slotted portion 33 of extension 32 into a concentrated slurry of previously precipitated calcium carbonate containing solids, which is held in suspension by rotation of stirrer 44. The water rising out of this slurry is freed of a large part of the suspended matter. The partially clarified water then is subjected to coagulation in the upper portion of the lower compartment, where coagulant, admitted through pipe 68, is gently mixed with the water by rotor 43. The coagulated water passes through the orifices 22 into the clarifier 12. To enhance clarification, the water is first deflected downward toward the bottom by baffle 70, and then changes its direction, flowing upward to the orifices 72 and into launder 71, from which it is withdrawn through effluent conduit 73. Sludge settling on the bottom of compartment 27 and clarifier 12 is blown down periodically, as required, through line 54 and its connected blow off line, and through lines 74 and 75, respectively.

The clarified water may be passed to a point of use, or to a filter, or other type of further treatment, as required.

The conductivity cells 81 and 82, measure the conductivity of the raw water and the conductivity of the content of the upper compartment, respectively, and transmit corresponding electrical impulses to the conductivity ratio controller 80. In response to these impulses, the ratio controller starts and stops the lime feeder drive 64 through its starter 65 to maintain the conductivity ratio for which it is set. As explained above, this ratio preferably is set to at least 1.0+, and this assures that sufficient lime is fed always despite varying conditions to fully treat the raw water entering the upper compartment. With proper proportioning of the parts of the raw water going to the upper compartment 26 and to conduit 30, there will be sufficient excess lime in the effluent from the upper compartment for the treatment of the raw water added in conduit 30, so as to obtain a properly treated final water.

The simple structure described establishes in the reactor 10 several distinct zones, wherein different pH values prevail. The upper compartment constitutes a high pH control zone wherein mixing of and primary reactions between raw water and lime are effected in the presence of return slurry and wherein one of the electrodes connected to the conductivity ratio controller 80 continuously meters the conductivity of the mixture and signals it to the controller. The conduit 30 forms a stabilization zone wherein the excess lime in the effluent of the control zone reacts with the bicarbonate alkalinity in the untreated water added to the effluent therein. The lower part of the lower compartment serves as a gross clarification zone, wherein a large part of the suspended solids of the effluent are retained. The pH in the stabilization and gross clarification zones, while high, is appreciably lower than in the control zone 26 due to the reaction between the excess lime and the bicarbonate alkalinity of the raw water added in conduit 30. The upper portion of the lower compartment is a flocculation zone, wherein, due to the addition of the fluocculants, the pH usually is still somewhat lower than in the stabilization and gross clarification zones.

The slurry concentration in the control zone is maintained at a very high value, whereby excellent contact between raw water and slurry takes place. The reactions in the control zone are accelerated by the presence of a large quantity of excess lime. The secondary reactions are completed in the presence of the large quantity of previously precipitated calcium carbonate containing solids in the gross clarification zone.

Important savings in chemicals are obtained by coagulating partially clarified liquid. In some cases coagulants will not be required.

In the embodiment of the invention shown in FIGURE 4, the reactor 10a is centrally arranged in the clarifier 12a, spaced from the bottom 18a of the clarifier. The lower portion of the wall 85 of the reactor 10a may slope inwardly, as shown. A hood-like partition 86 extends from an elevation above the lower end of wall 85 to near the bottom of the clarifier 12a and forms with the wall 85 a passageway 87 through which the reactor is in hydraulic communication with the clarifier.

A horizontal partition 25a forms in the reactor upper and lower compartments, 26a and 27a, respectively, which are in hydraulic communication through ports 88 in partition 25a. A shaft 40a extends through the upper and lower compartments and into the space under the hood-like partition 86. The drive means 36a for the shaft may be supported in any suitable manner. Affixed to shaft 40a is a mixing rotor 42a in the upper compartment, a flocculating rotor 43a in the lower compartment, a turbine type rotor 89 which is fitted into a central opening in the top of the hood-like partition 86, and a stirrer 44a extending across and spaced from the bottom 18a of the clarifier.

A portion of the raw water to be treated and lime for the treatment are introduced into the upper compartment 26a through a raw water inlet conduit 46a and a lime conduit 55a, respectively. Previously precipitated calcium carbonate containing solids are withdrawn from the lower portion of the clarifier 12a by means of a pump 90 and conveyed to the upper compartment 26a of the reactor through a slurry return line 91.

Another portion of raw water to be treated is admitted to the lower compartment through a conduit 51a and coagulant is introduced through a pipe 68a.

The clarifier 12a has a launder 71a with means, such as an overflow 93 establishing the maximum liquid level.

In the bottom of the clarifier a sludge sump 94 is provided from which leads a sludge withdrawal pipe 95.

The lime feed and feed control equipment are the same as described in connection with FIGURES 1 to 3, with one electrode, 81a, extending into the raw water stream and the other, 82a, into the upper or control compartment 26a of the reactor.

In the operation of this embodiment a definite portion of raw water to be treated is mixed in the upper compartment 26a with a quantity of lime sufficient to maintain the conductivity of ratio for which the ratio controller is set, and with return solids withdrawn from the lower portion of the clarifier 12a by pump 90. Effluent from the upper compartment 26a enters the lower compartment 27a through ports 88. The heavier solids in the effluent sink and slide down over the inclined wall of the hood-like partition 86 into the clarifier 12a. The partially clarified effluent is mixed by rotation of rotor 43a with the portion of the raw water entering through conduit 51a, with coagulant entering through pipe 68a, and with slurry of previously precipitated solids which is pumped by the turbine 89 from the clarifier 12a into the lower compartment 27a.

The treated and flocculated effluent of the lower compartment enters the clarifier 12a through passageway 87 and flows upward to and into the launder 71a, from which it is withdrawn through effluent conduit 73a. The sludge settling in the clarifier is stirred by stirrer 44a to maintain it in a fluid condition.

The correct split between the water going to the control zone and that going to the stabilization zone can readily be calculated.

Assuming, for example, that the alkalinity of the raw water is 100 p.p.m., then (1)

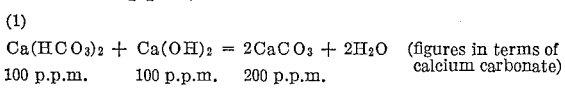

$Ca(HCO_3)_2 + Ca(OH)_2 = 2CaCO_3 + 2H_2O$ (figures in terms of calcium carbonate)
100 p.p.m.   100 p.p.m.   200 p.p.m.

The reduction in conductance represented by the above reaction is approximately 200 micromhos, since each part per million of $Ca(HCO_3)_2$ as $CaCO_3$ has a conductance of 2 micromhos. If the ratio controller is set at 1.0, an excess of lime will be present equivalent to a conductance of 200 micromhos. Since each p.p.m. of $Ca(OH)_2$ has a conductance of approximately 5 micromhos, the excess of $Ca(OH)_2$, under these circumstances, is 200/5=40 p.p.m. as $CaCO_3$. This is sufficient to treat an additional 400 milliliters of the raw water for each 1 liter of raw water treated in the control compartment. In other words, for correct treatment of the total volume of water, 71% will be mixed and reacted with the entire lime, and thereafter 29% untreated raw water will be added to the over treated 71%.

If the raw water changes so that it contains 200 p.p.m. $Ca(HCO_3)_2$ as $CaCO_3$, the excess of $Ca(OH)_2$ will be 80 p.p.m. as $CaCO_3$. In this case, as in any other increase or decrease in $Ca(HCO_3)_2$ content, the 71%–29% ratio still would apply.

Assuming that the raw water changes and the water contains in addition to the calcium bicarbonate also magnesium sulfate, then:

(2) $Ca(HCO_3)_2 + MgSO_4 + 2Ca(OH)_2$
$= 2CaCO_3 + Mg(OH)_2 + CaSO_4 + 2H_2O$

The reduction in conductance in this case is the same as in Equation 1, i.e. 200 micromhos, as $CaSO_4$ is produced equivalent to $MgSO_4$ and these have the same conductance.

In the second stage, with the same 71%–29% split, the reaction would be as follows:

(3) $Ca(OH)_2 + Ca(HCO_3)_2 + MgSO_4$
$= 2CaCO_3 + MgSO_4 + 2H_2O$

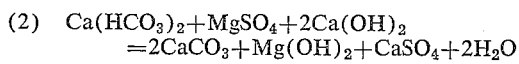

This represents a properly treated water, where complete magnesium precipitation is not required. Where it is desired to precipitate magnesium also in the second stage, only 200 ml. of raw water should be added in the second stage, resulting in a split of 83%–17%, the reaction in the second stage then being as follows:

(4) $2Ca(OH)_2 + Ca(HCO_3)_2 + MgSO_4$
$= 2CaCO_3 + Mg(OH)_2 + CaSO_4 + 2H_2O$

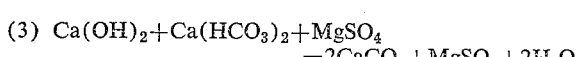

Equation 4 also represents a properly treated water.

*Example*

The analysis of a certain raw water of variable nature has been found to be at different times as follows:

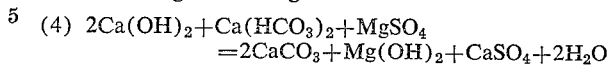

| | First Period | Second Period | Third Period | |
|---|---|---|---|---|
| P | 0 | 0 | 0 | |
| M | 294 | 295 | 300 | p.p.m. as |
| Ca | 272 | 286 | 264 | CaCO₃ |
| Mg | 155 | 160 | 161 | |

The minimum and maximum quantities of lime required in the second stage during the first period are determined by the following equations:

(5)   $Ca(HCO_3)_2 + Ca(OH)_2 = 2CaCO_3 + 2H_2O$
      272 p.p.m.   272 p.p.m.

Reduction in conductivity from Equation 5 is 2×272=544 micromhos. Excess $Ca(OH)_2$=544/5=109 p.p.m.

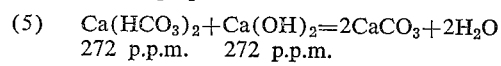

(6)   $Mg(HCO_3)_2 + 2Ca(OH)_2$
      22 p.p.m.   44 p.p.m.
      $= 2CaCO_3 + Mg(OH)_2 + 2H_2O$

Reduction in conductivity is 2×22=44 micromhos. Excess $Ca(OH)_2$=44/5=9 p.p.m.

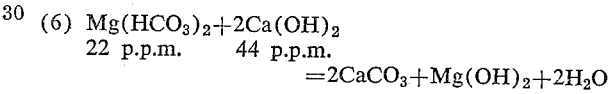

(7)   $MgSO_4 + Ca(OH)_2 = CaSO_4 + Mg(OH)_2$
      133 p.p.m.   133 p.p.m.   133 p.p.m.

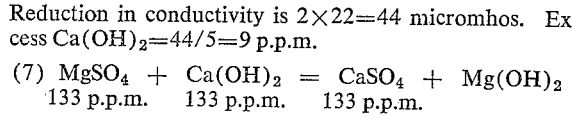

No change in conductivity results from Reaction 7.

The above equations show:

Total excess lime in the first stage 109+9=118 p.p.m.
Lime needed for Reactions 5 and 6=272+44=316 p.p.m.
Lime required for Reactions 5, 6 and 7=272+44+133
=449 p.p.m.

From these equations it follows that any value from a minimum of 316 p.p.m. to a maximum of 449 p.p.m. of lime in the second stage will result in properly treated final water when a final water of minimum total alkalinity is required, as is most frequently the case. If less than 316 p.p.m. of lime are applied, there is not sufficient lime to react fully with the alkalinity present. As more than 316 p.p.m. are applied, magnesium is precipitated. If more than 449 p.p.m. are applied, the final water will contain an excess of soluble $Ca(OH)_2$.

The split of the raw water between the first and second stage which provides a properly treated total effluent can be calculated from the above equations.

The excess lime available for treatment of raw water in the second stage is 118 p.p.m. 316 p.p.m. of lime are required per liter of raw water if it is not desired to precipitate magnesium in the second stage. Therefore, the quantity of raw water which can be treated in the second stage with the excess lime available is:

118/316×1000 ml.=370 ml.

This results in a split of 73% of the raw water being treated going to the first stage and 27% to the second stage.

If magnesium should be precipitated in the second stage, 449 p.p.m. of lime are required per liter of raw water. Therefore, the quantity of raw water which can be treated in the second stage under these circumstances is:

118/449×1000 ml.=260 ml.

This results in a split of 79% of the raw water being treated going to the first stage and 21% to the second stage.

Obviously, any split within the range of from 73%–27% to 79%–21% in the second stage will produce a properly treated final water.

During the second period, with M 295, Ca 286 and Mg 160, the split will be 72%–28% if magnesium is not to be precipitated in the second stage, and 79%–21% if it is desired to precipitate magnesium in the second stage.

During the third period, with M 300, Ca 264, and Mg 161, the split is 73%–27% without magnesium precipitation in the second stage, and 79%–21% with magnesium precipitation. A single split resulting in satisfactory treatment under these varying conditions of the same raw water can readily be established.

An apparatus according to the invention has been operated with Tucson tap water over extended periods, with attention largely limited to keeping the lime feeder supplied with lime. The alkalinity of Tucson water varies within the range of from 130 p.p.m. to 230 p.p.m. and changes in raw water alkalinity are frequent and rapid. Changes of +75 p.p.m. have been noted in one hour. Despite these wide and sudden variations, the treated water was very uniform in P and M alkalinity.

To test the effectiveness of my new process, 2 p.p.m. of metaphosphate were fed for 24 hours into the plant. It is well known that metaphosphate in such quantities inhibits lime softening in conventional lime treatment plants. In my plant the metaphosphate did not affect the uniformly good results of the operation. When the metaphosphate feed was increased, the process remained unaffected until 5 p.p.m. was reached. Then the results became less good and uniform.

While I have described and shown a portion of the raw liquid being mixed with the effluent of the control compartment, it should be understood that this split treatment is not a requirement of the invention and that in many cases all the liquid to be treated will be introduced into the upper or control compartment. In such cases the reactor effluent will be treated by carbonation with flue gas or liquid carbon dioxide in known manner. Simple means effecting carbonation are diagrammatically shown in FIGURE 1. A sparger ring 100 below the rotor 43 is connected by a line 101 to any suitable source of flue gas or liquid carbon dioxide under sufficient pressure to permit introduction of the gas or liquid through the orifices of the sparger ring. The gas or liquid discharged from the sparger ring 100 is mixed by rotor 43 with the partially clarified liquid in the upper portion of the lower compartment, simultaneously with the mixing of the coagulant with the liquid. Another point of application of carbonation would be in the lower portion of the clarifier 12.

The conductivity ratio of 1.0+ is the most practical and preferred ratio, due, for example, to the fact that the unit, when first filled with water, will not be self-starting unless the ratio is set to at least 1.0+. Similarly, if an operator forgets to replenish the lime in the lime feeder, and the control compartment consequently contains only water, the unit will not start automatically unless the conductivity ratio exceeds 1.0. However, the process and apparatus are also operable with somewhat lower ratios, as long as the amount of lime fed to the control compartment will be sufficient to ensure proper treatment of the total water. The control with such lower ratios requires manual starting under the specific circumstances outlined above.

There are also cases where a higher ratio, such as 1.1 or more, is indicated. For example, it has been proposed as one of the most efficient means of removing proteins from water to treat the water with a large excess of lime. Therefore, while the 1.0+ ratio usually is preferred, it should be understood that the invention is not limited to this specific ratio, but that lower and higher ratios can be used.

The invention is particularly useful in the treatment of liquids of variable quality, and/or quantity, and/or temperature. However, the invention can also be used with advantage in the treatment of liquids having constant characteristics. In the novel treatment plant the complicated and expensive feeders, proportioners and flow controllers of conventional plants are no longer needed. Instead very simple, inexpensive and reliable feeding and control equipment is used, which also permits savings in the cost of chemicals and of their handling.

I claim:

1. A method of treating a liquid of variable mineral content with lime to reduce alkalinity and obtain a treated liquid of uniform quality, comprising adding to a portion of untreated liquid in a first zone a larger quantity of lime than required for the precipitation of the bicarbonates of calcium and magnesium in said portion of untreated liquid, said quantity being sufficient to maintain a ratio between the conductance of the lime treated liquid and the conductance of the untreated liquid which is about 1.0, continuously measuring the conductance of the lime treated liquid and of the untreated liquid and controlling the lime feed to maintain said ratio, mixing with the excess lime containing effluent of said first zone an additional portion of untreated liquid in a second zone, said additional portion of untreated liquid being proportioned so that the excess lime in said effluent is sufficient to precipitate at least the bicarbonates of calcium in said additional portion, and clarifying the effluent of said second zone.

2. A method of treating a water of variable mineral content with lime to reduce alkalinity and obtain a treated water of uniform quality, comprising adding to a portion of raw water in a first zone a larger quantity of lime than required for the precipitation of the bicarbonates of calcium and magnesium in said portion of raw water, said quantity being sufficient to maintain a ratio between the conductance of the lime treated water and the conductance of the raw water which is about 1.0, mixing with the excess lime containing effluent of said first zone an additional portion of raw water in a second zone, said additional portion of raw water being proportioned so that the excess lime in said effluent is sufficient to precipitate at least the bicarbonates of calcium in said additional portion, separating precipitated calcium carbonate containing solids from the effluent of said second zone, returning a portion of the separated solids to said first zone, withdrawing excess solids from said second zone, and withdrawing clarified effluent from said second zone.

3. A method according to claim 2, wherein the effluent of said second zone is carbonated.

4. A method according to claim 2 wherein the lime added to the liquid to be treated is a paste-like slurry and is prepared by depositing the lime on the surface of sufficient water to obtain wetting of the lime but insufficient to permit substantial settling of lime from the resulting paste-like slurry.

5. A method according to claim 2 wherein said separating precipitated calcium carbonate solids from the effluent of said second zone comprises the steps of first partially clarifying the effluent from the second zone by settling out a large portion of the calcium carbonate containing solids, coagulating the partially clarified effluent, and separating the remaining coagulated solids from said effluent.

6. A method of treating a variable water with lime to obtain a treated water of uniform quality comprising mixing lime with water in a control zone, continuously measuring the conductance of the limed water in said control zone and the conductance of the raw water, stopping the lime feed when the ratio between the conductance of the limed water and the conductance of the raw water exceeds about 1.0+, and starting the lime feed again when said ratio drops below about 1.0+, separating solids from the effluent of said control zone in a clarifying zone, withdrawing clarified effluent from an upper portion of said clarifying zone, returning a portion of the separated solids from a lower portion of said clarifying zone to said control zone and mixing it therein with the water and lime, and withdrawing excess solids from said clarifying zone.

7. A plant for automatically treating a liquid with lime comprising a reactor having a control chamber, an outlet from said control chamber, a raw liquid conduit discharging into said control chamber, means for conveying lime into said control chamber, means for mixing lime with liquid in said control chamber, means for starting the operation of said lime conveying means, a conductivity ratio controller, a power circuit through said controller and said means for starting the operation of said lime conveying means, a pair of electrodes electrically connected with said conductivity ratio controller, one of said electrodes extending into said control chamber and measuring the conductivity of the contents of said control chamber, the other of said electrodes extending into said raw liquid conduit and measuring the conductivity of the raw liquid, each electrode transmitting signals to said conductivity ratio controller corresponding to the conductivity measured by it, said conductivity ratio controller closing said power circuit to start the operation of said lime conveying means when the ratio between the signal corresponding to the conductivity of the contents of the control chamber and the signal corresponding to the raw liquid conductivity drops below the value for which the controller is set, and breaking said power circuit to stop operation of said lime feeder when said value is reached, and means for clarifying the effluent of said control chamber.

8. A plant according to claim 7, including means for carbonating the effluent of said control chamber.

9. A plant for automatically treating a water with lime comprising a reactor, a clarifier, a passageway establishing hydraulic communication between a lower portion of said reactor and a lower portion of said clarifier, a horizontal partition extending across said reactor and forming therein an upper and a lower compartment, port means in said partition for flow of water from said upper to said lower compartment, a raw water conduit, means for discharging raw water from said raw water conduit into said upper compartment, a shaft extending through said upper compartment and into said lower compartment, a mixing rotor affixed to said shaft in said upper compartment, a flocculating rotor affixed to said shaft in said lower compartment, means for rotating said shaft, means for conveying lime to said upper compartment, means for starting and stopping operation of said lime conveying means, means for withdrawing clarified treated water from an upper portion of said clarifier, means for returning solids separated from the effluent of said upper compartment to said upper compartment, means for introducing coagulants into said lower compartment, a first and a second electrode extending into and measuring the conductivity in said upper compartment and said raw water conduit, respectively, a conductivity ratio controller, said electrodes being electrically connected to said controller and transmitting thereto electrical impulses proportionate to the conductivity measured, a power circuit through said controller and the means for starting and stopping operation of said lime conveying means, said controller closing said power circuit when the ratio between the conductivity measured by said first electrode and the conductivity measured by said second electrode drops below the value for which it is set, and opening said power circuit when said ratio reaches said set value, and means for discharging excess solids from said plant.

10. A plant according to claim 9, including also means for discharging a portion of water from said raw water conduit into said lower compartment, and wherein said set value is about 1.0+.

11. A plant according to claim 9, including also means for carbonating the liquid after it has left said upper compartment.

12. Apparatus for automatically treating variable liquids with lime, comprising a basin, a vertical partition extending across said basin from the bottom to an elevation above the predetermined maximum liquid level therein and forming in said basin a reactor and a clarifier, a horizontal partition across said reactor and forming therein an upper and a lower compartment, said lower compartment being in hydraulic communication with said clarifier through a passageway through said vertical partition, a raw liquid conduit, means for introducing a predetermined amount of the raw liquid to be treated from said conduit into said upper compartment, means for withdrawing clarified treated liquid from said clarifier, means for discharging excess solids from said basin, means for feeding lime into said upper compartment, means for driving said lime feeding means, a shaft extending through said upper compartment and into said lower compartment, a mixing rotor affixed to said shaft in, and operative to mix the contents of, said upper compartment, a flocculating rotor affixed to said shaft in the upper portion of said lower compartment, a stirrer affixed to said shaft in the lower portion of said lower compartment and operative to hold a slurry of calcium carbonate containing solids precipitated in and separated from previously treated liquid in suspension, means for rotating said shaft, conduit means leading from said upper compartment into the lower portion of said lower compartment and discharging adjacent said stirrer, means for introducing a predetermined portion of the raw liquid to be treated into said conduit means, means for continuously conveying some of said slurry to said upper compartment for admixture with the liquid and lime therein, means for introducing coagulant into the upper portion of said lower compartment adjacent said flocculating rotor, and control means for regulating the feed of lime to maintain the ratio between the conductivity of the contents of said upper compartment and the conductivity of the raw liquid at a predetermined value, said control means comprising a first conductivity measuring means extending into said upper compartment, a second conductivity measuring means extending into said raw liquid conduit, a conductivity ratio controller, said first and second conductivity measuring means being electrically connected to said conductivity ratio controller and transmitting thereto electrical impulses proportional to the conductivity measured, and a power circuit through said conductivity ratio controller and said drive means, said conductivity ratio controller closing said power circuit to start said drive means when the ratio between the conductivities measured by said first and second conductivity measuring means drops to below said predetermined value, and opening said power circuit to stop said drive means when said ratio reaches said predetermined value.

References Cited by the Examiner

UNITED STATES PATENTS

| 1,145,509 | 7/1915  | Pike et al. _____ 137—5    |
| 1,388,613 | 8/1921  | Simsohn _____ 23—253 X       |
| 1,653,272 | 12/1927 | Green et al. _____ 210—46    |
| 2,179,246 | 11/1939 | Applebaum _____ 210—208        |
| 2,296,437 | 9/1942  | Green _____ 210—20         |
| 2,528,879 | 11/1950 | Green _____ 210—208 X        |

FOREIGN PATENTS

| 11,354 | 1901 | Great Britain. |

OTHER REFERENCES

"Automation and Remote Control of Chemical Feeders"—Coffman, Jour. AWWA, vol. 49, pp. 1378–1386, November 1957.

(Other references on following page)

OTHER REFERENCES

Betz, Handbook of Industrial Water Conditioning, Fifth edition, 1957, Betz Laboratories, Inc., Philadelphia 24, Pa., page 33.

"Conductivity—Difference Control of Chemical Coagulation"—Babcock et al., Jour. AWWA, vol. 48, article beginning on page 622, June 1956.

"Conductometric Control of Coagulant Dosage in Treatment Plants"—Granstrom et al., Jour. AWWA, vol. 50, pp. 410–416, March 1958.

Heise et al., Disposal of Waste Pickle Liquor etc., Proc. 9th Ind. Waste Conf., Purdue U., 1954, pp. 381–390.

"Illinois's Experiences in Lime Softening With Short-Time Upward-Flow Clarification"—Spafford et al., Journal AWWA, vol. 31, October 1939, pages 1734–1754.

MORRIS O. WOLK, *Primary Examiner*.